United States Patent
Krippendorf et al.

(10) Patent No.: US 8,872,649 B2
(45) Date of Patent: Oct. 28, 2014

(54) ALARM SYSTEM

(75) Inventors: Tido Krippendorf, Erkelenz (DE); Bernd Lübben, Korschenbroich (DE); Heiner Politze, Neuss (DE)

(73) Assignee: Novar GmbH, Neuss (DE)

( * ) Notice: Subject to any disclaimer, the term of this patent is extended or adjusted under 35 U.S.C. 154(b) by 237 days.

(21) Appl. No.: 13/369,084

(22) Filed: Feb. 8, 2012

(65) Prior Publication Data

US 2012/0206257 A1   Aug. 16, 2012

(30) Foreign Application Priority Data

Feb. 10, 2011   (DE) .......................... 10 2011 010 922

(51) Int. Cl.
G08B 1/08 (2006.01)
H04L 12/40 (2006.01)
G08B 26/00 (2006.01)
G08B 29/18 (2006.01)
G08B 25/04 (2006.01)

(52) U.S. Cl.
CPC .............. *G08B 25/045* (2013.01); *H04L 12/40* (2013.01); *G08B 26/001* (2013.01); *G08B 29/181* (2013.01)
USPC ............... 340/538; 340/506; 340/511; 701/1; 370/245

(58) Field of Classification Search
USPC ........ 340/538, 506, 511; 701/1; 370/245, 395
See application file for complete search history.

(56) References Cited

U.S. PATENT DOCUMENTS 6,600,723 B1 *   7/2003   Reeb et al. .................... 370/245
2006/0014054 A1 *   1/2006   Sugawara .......................... 429/7

FOREIGN PATENT DOCUMENTS

DE          196 31 302 A1        2/1998
DE       10 2008 050 636 A1      4/2010
DE       10 2009 004 974 A1      7/2010

OTHER PUBLICATIONS

European Search Report, dated Jul. 4, 2012, corresponding to Application No. EP 12 15 4920.

* cited by examiner

*Primary Examiner* — Daryl Pope
(74) *Attorney, Agent, or Firm* — Husch Blackwell LLP

(57) ABSTRACT

An alarm system control center has subscribers connected to it by a two-wire line. The subscribers receive via the two-wire line both a power supply voltage and communication messages in the form of pulse trains impressed on the power supply voltage as voltage modulation. Each subscriber includes a constant current circuit which is connected to the two-wire line and which is used to charge a storage capacitor with a voltage regulator coupled to it. In order to reduce communication errors, a transformer is provided to reduce power supply voltage to an internal value which is lower than the than the power supply voltage at least by the voltage swing of the pulses of the communication messages on the two-wire line.

14 Claims, 4 Drawing Sheets

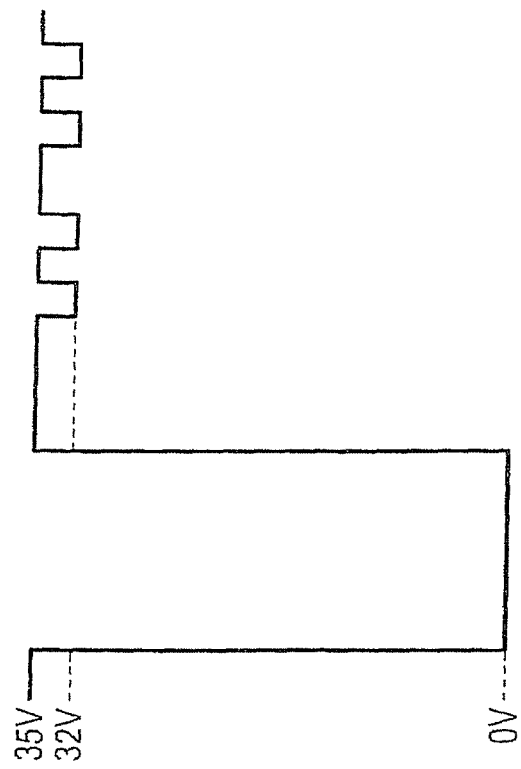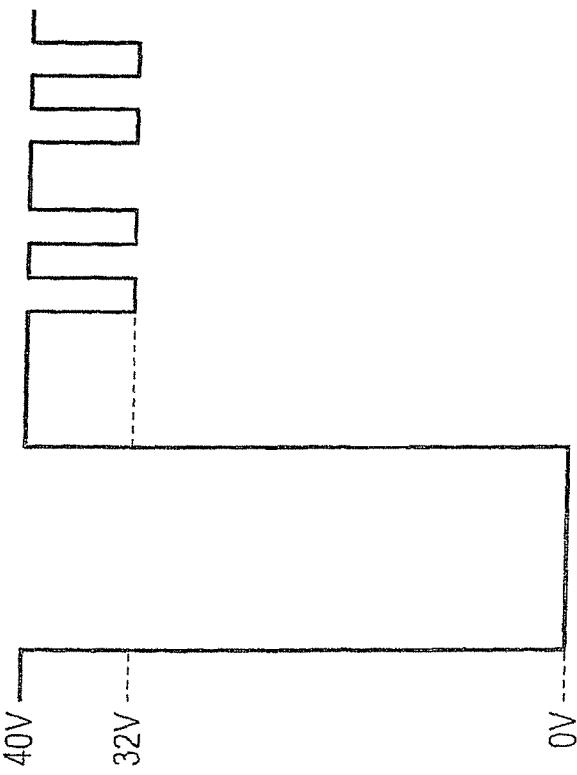

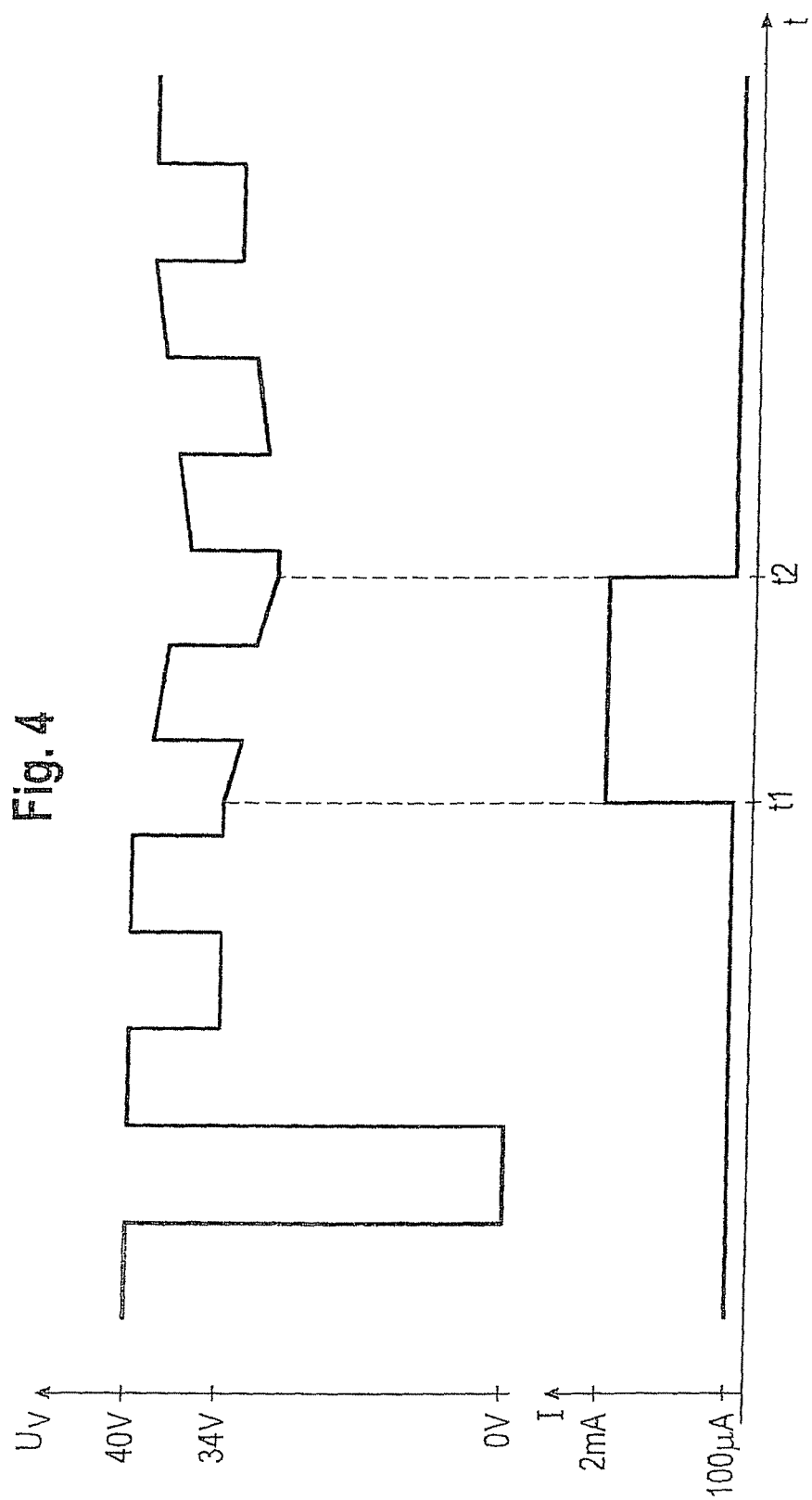

ALARM SYSTEM

FIELD

This application pertains to alarm systems and associated methods. More particularly, it pertains to such systems and methods where two wire communication lines carry both electrical energy and pulsed messages.

BACKGROUND

Methods are known for operating an alarm system having a control centre and at least one control module which uses a two-wire line, used as a field bus, to provide a plurality of subscribers with a power supply voltage and to send communication messages in the form of pulse trains impressed on the power supply voltage, wherein each subscriber takes the power supply voltage and produces an internal operating voltage which is lower than the power supply voltage.

Alarm systems are known which have a control centre and at least one control module to which subscribers are connected by means of a two-wire line, said subscribers receiving from the control module, via the two-wire line operated as a field bus, both a power supply voltage and communication messages in the form of pulse trains impressed on the power supply voltage as voltage modulation, and each subscriber comprises a constant current circuit which is connected to the two-wire line and which is used to charge a storage capacitor which has a voltage regulator connected to it which produces an internal operating voltage.

Alarm systems of the type cited above are prior art. The two-wire line to which the subscribers are connected in parallel may have a length of between 1000 and 2000 m, for example, and is frequently routed in a ring shape, i.e. it starts and ends at the control module. The two-wire line is also referred to simply as a field bus or signalling line and the control module is also referred to as a bus master.

The subscribers may be sensors, e.g. fire or burglar alarms, and/or actuators, such as light-signal or sound-signal generators. The power supply voltage for the subscribers may be in the range from 20 to 40 volts, for example, at the start of the two-wire line.

The communication between the control module and the subscribers is handled on the basis of a digital communication protocol. The communication protocol defines time slots or time windows which are used to transmit pulses and pulse trains as data messages which represent addresses, commands and reports, in particular. Depending on the meaning assigned to them, the pulses may comprise starting pulses with a length of 1 ms, for example, synchronization or separating pulses with a length of 0.5 ms, for example, and pulse trains representing bit-coded messages, with a single pulse length of between 100 and 200 μs, for example.

The control module transmits the pulses and pulse trains to the subscribers by lowering the level of the power supply voltage for the length of the respective pulse, that is to say in the form of voltage modulation of the power supply voltage. In this case, the voltage swing or the modulation depth of the pulse trains embodying bit-coded messages may be a few volts, while the "long" starting and/or separating pulses may have other levels, e.g. 0 volt and/or +3 volts. The subscribers usually respond with appropriate current modulation.

The subscribers use an internal operating voltage which each subscriber derives from the power supply voltage or line voltage. In order to ensure that the power supply voltage or line voltage does not dip to a great extent when the signalling line is initialized or owing to a high current requirement for an individual subscriber in the course of operation, an internal storage capacitor in each subscriber is charged via a constant current circuit which limits the current to a few hundred μA, for example. The storage capacitor has a voltage regulator connected to it which provides the internal operating voltage of usually +3.3 V which the microcontroller and most other circuits in the subscribers use, except for actuators or actuator circuits, which draw their supply of voltage or current directly from the storage capacitor.

Each subscriber has a communication interface connected to the two-wire line, e.g. a UART interface for its microcontroller, which microcontroller detects and processes the pulses and pulse trains.

In connection with the manner of obtaining the internal operating voltage of the subscribers which is described above, this communication method has the drawback that not only the power supply voltage but also, in particular, the voltage swing which embodies the voltage modulation, and which may be 10 V, for example, at the start of the two-wire line, becomes increasingly smaller towards the end of the two-wire line on account of the resistance of the two-wire line. This can be attributed to the fact that the constant current circuits of the subscribers load the two-wire line or the power supply voltage only during the pulse pauses, because during the pulse length the power supply voltage is below the value of the voltage to which the storage capacitor of each subscriber has been charged as a voltage buffer, that is to say buffers the line voltage that is lower during the pulse length. In other words, the power supply voltage source and the two-wire line are loaded only during a pulse pause, because the subscribers are fed from their internal storage capacitor during the pulse length.

Towards the end of the two-wire line, the voltage swing can therefore become so small—on account of the loading of the two-wire line, which increases with the number of subscribers, in conjunction with the resistance of said two-wire line—that the subscribers in question are no longer able to detect the edges of the pulses correctly, since the gradient of the pulse edges also decreases as the length of the two-wire line increases. A further cause of communication errors which increase with the length of the two-wire line is that an additional current requirement for a subscriber, e.g. when an actuator circuit is connected, likewise results in a sudden decrease in the power supply voltage. This fall in the power supply voltage can be erroneously detected as the falling edge of a pulse by one or more subscribers.

SUMMARY

The invention is based on the object of providing a method for operating an alarm system of the type specified at the outset which affords improved communication certainty.

The invention achieves this object in that the power supply voltage in each subscriber is reduced to an internal supply voltage which is lower than the power supply voltage at least by the amplitude of the pulses of the communication messages, and in that the internal operating voltage of the subscriber is produced from this internal supply voltage.

The effect achieved by this is that the power supply voltage, to be more precise the voltage source in the control module or bus master, is loaded "symmetrically", because each subscriber now also draws current from the two-wire line during the length of the communication pulses. Therefore, although the power supply voltage in the quiescent state and during the sending of communication messages during the pulse pauses falls as the length of the two-wire line increases, as previously, the voltage levels which are lower during the pulse lengths also fall by approximately the same degree, as a result of which the swing in the voltage modulation remains approximately the same largely irrespective of the length of the two-wire line, specifically even if one or more subscribers suddenly draw increased current from the two-wire line.

An improvement in the method involves the internal supply voltage of each subscriber being produced from the power supply voltage so as to rise gradually with a time delay. This additionally prevents the power supply voltage from undergoing sudden changes which resemble the edges of communication pulses.

The invention is based on the further object of providing an alarm system which allows a greater length for the two-wire line as a result of improved communication certainty.

This object is achieved in an alarm system having the features of the preamble of claim 3 in that the constant current circuit has a voltage transformer connected upstream of it which reduces the power supply voltage to an internal supply voltage which is lower than the power supply voltage at least by the voltage swing of the pulses of the communication messages on the two-wire line.

In a similar manner to the method explained above, the effect achieved by this is that the constant current circuits of the subscribers also draw current at the lower level of the communication pulses on the two-wire line, because the internal supply voltage of the subscribers is lower than the level of the power supply voltage during the length of the communication pulses. Therefore, the length of the two-wire line can be increased and/or a larger number of subscribers containing actuators with a comparatively high current or power requirement can be connected without diminishing communication certainty.

Preferably, the voltage transformer comprises a simple in-phase regulator.

This in-phase regulator may comprise a regulating transistor in an emitter-follower circuit, the collector/base junction of said regulating transistor containing a zener diode for producing the supply voltage on the emitter of the regulating transistor, said zener diode having an RC element connected in series with it, the other connection of which is connected to that wire of the two-wire line which is at the reference-earth potential (earth). The zener diode essentially determines the value of the internal supply voltage. The RC element is proportioned such that its time constant is longer than the length of the communication pulses and is preferably a multiple of this pulse length. The input of the in-phase regulator and the connection which carries the power supply voltage and which is connected to the other wire of the two-wire line may have a forward-biased diode between them. During the low-level of the communication pulses, the capacitor of the RC element therefore discharges via the base/emitter path of the regulating transistor, as a result of which the latter remains in the on state, and therefore the subscriber also draws current during the communication pulses. This diode prevents the regulating transistor from turning on inversely in the case of power supply voltage levels which are below the value of the internal supply voltage.

In an improved embodiment, the zener diode has a diode in series with it which prevents the capacitor of the RC element from discharging via the collector/emitter path of the regulating transistor when the internal supply voltage of the subscriber falls. The diode ensures that the capacitor of the RC element discharges exclusively via the base/emitter junction of the regulating transistor and therefore keeps the latter in the on state.

Preferably, the in-phase regulator has a further, switchable constant current circuit connected to it in parallel with the constant current circuit. This further constant current circuit can, in particular, be designed, and/or controlled by means of the microcontroller which is always present in the subscribers, such that the internal storage capacitor is charged with a correspondingly higher current when the power supply voltage is switched on and/or when there is an increased current requirement for the subscriber. There is an increased current requirement for the subscriber, in particular, when the subscriber sends a current-coded data message to the control module by activating an internal current sink and/or when the microcontroller activates a further subscriber circuit, e.g. a gas sensor circuit or an acoustic signal generator.

At least one of the constant current circuits may have a control input which has an RC element connected to it which delays the rise of the current provided by the constant current circuit at least when the subscriber is connected to the power supply voltage. Normally, the control module connects the subscribers successively to the two-wire line and hence to the power supply voltage in an initialization routine. The delayed current rise prevents the connection of a subscriber from resulting in a sudden fall in the power supply voltage which can act like the falling edge of a communication pulse for the subscribers which are already switched on. Therefore, both constant current circuits preferably have RC elements connected to them.

Preferably, the capacitor of the RC element of the (respective) constant current circuit is connected to the control input via a resistor which, with this capacitor, forms a further RC element which has a discharge time constant which is greater than the pulse length of the longest communication pulse and is preferably a multiple of this pulse length. The internal storage capacitor, which is not charged during the starting pulses and/or other pulses which are embodied by lowering of the level of the power supply voltage to a value below the value of the internal supply voltage, for example, therefore receives the charging current again as early as at the end of the relevant pulse, that is to say when the power supply voltage reaches its full output value again, because the control voltage is maintained at the control input of the or of both constant current circuits during the pulse length too, on account of the further RC element.

Preferably, one connection of the microcontroller of the subscriber is connected to the control input of the switchable constant current circuit and provides an inhibit signal as soon as the internal operating voltage of the subscriber has been reached.

In a development of this embodiment, the control input of this constant current circuit turned off after the internal operating voltage has been reached receives an enable signal via the same connection of the microcontroller when there is an increased current requirement for the subscriber or when the internal supply voltage falls, in order to recharge the storage capacitor in accelerated fashion.

A significant additional current requirement for a subscriber, e.g. as a result of an internal error, cannot be covered by means of the constant current circuit or circuits and can be covered only very briefly from the internal storage capacitor. In order to prevent the subscriber from failing completely in that case, the storage capacitor may have a voltage monitoring circuit connected to it which disconnects individual electrical loads in the subscriber if the internal supply voltage or the voltage across the storage capacitor, which voltage is of almost the same magnitude, falls below a prescribed threshold value. This allows the communication capability of the subscriber to be maintained, which means that said subscriber can send an error report to the control module. The control module can then, for its part, disconnect the subscriber using an addressed command.

BRIEF DESCRIPTION OF THE DRAWING

The invention is explained below with reference to the drawing, in which:

FIG. 2a shows a simplified graph of the time-dependent power supply voltage without a resistive load, FIG. 2b shows a simplified graph of the time-dependent profile of the power supply voltage with a resistive load, FIG. 4 shows a simplified graph of the time-dependent profile of the power supply voltage for the case of an increased current draw by the subscriber with a power supply as shown in FIG. 3.

DETAILED DESCRIPTION

Figure 1:
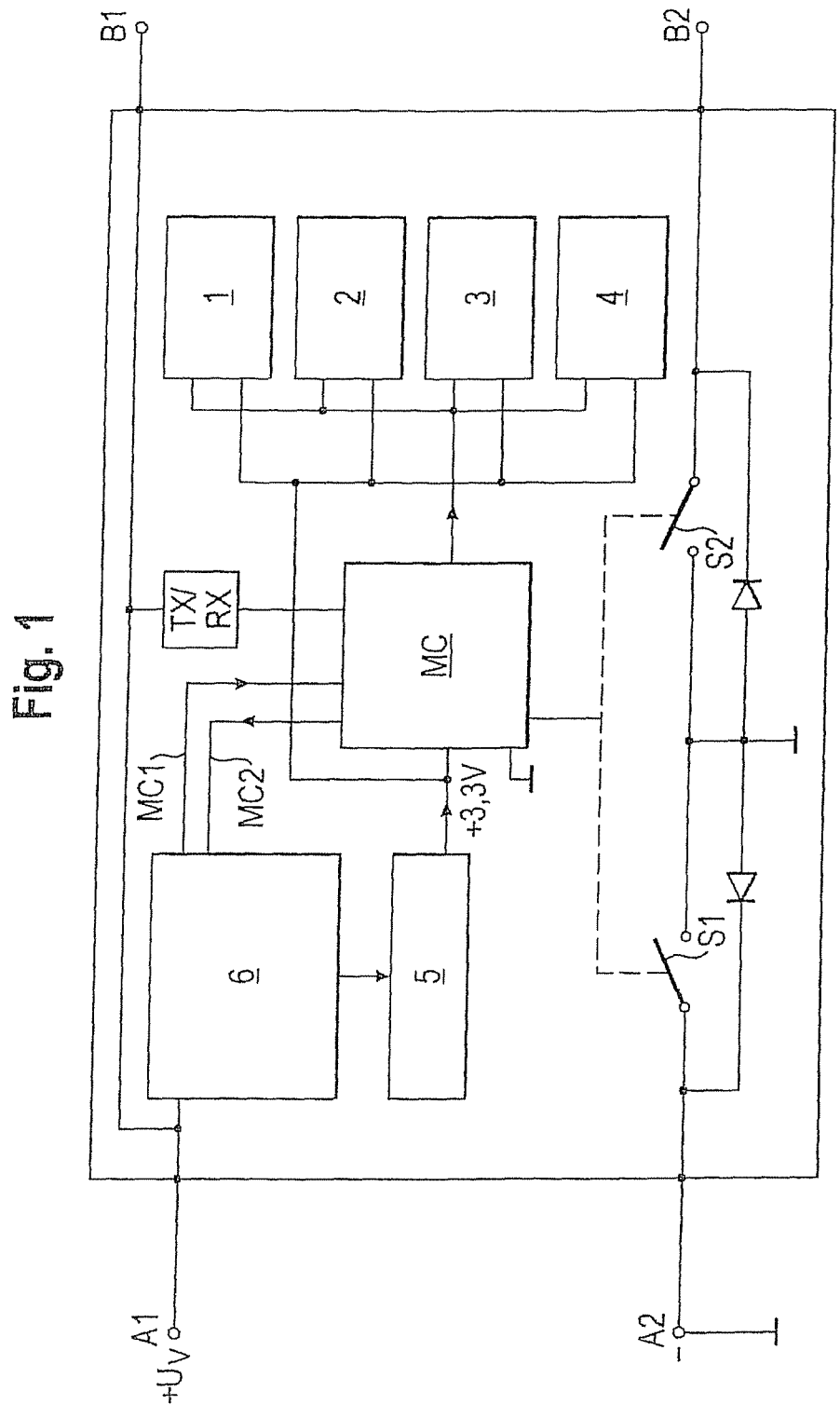
FIG. 1 shows a block diagram of a subscriber.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

As explained at the outset, alarm systems known from the prior art comprise a control centre (possibly also subordinate control centres) having at least one control module which is subsequently called a bus master. The bus master has both the start and the end of a two-wire line connected to it. The two-wire line has numerous subscribers electrically connected to it in parallel at intervals. The two-wire line provides the power supply voltage for the subscribers and is simultaneously used for bidirectional communication between the bus master and the subscribers. The two-wire line is therefore also referred to as a ring bus for short.

FIG. 1 shows a block diagram of a subscriber which has been chosen as an example, in this case in the form of a fire alarm. It has input connections A1 and A2 and output connections B1 and B2. One wire of the two-wire line, in this case the live wire between A1 and B1, is looped through the alarm. The other wire, which in this example is at reference-earth potential GND (Ground), is routed between A2 and B2 via two semiconductor switches S1 and S2 connected in series. The bus master can switch the switches S1 and S2 using control commands which are sent to the subscriber. In normal operation, S1 and S2 are closed. The fire alarm comprises a scattered light sensor 1, a gas sensor 2, a heat sensor 3 and an actuator 4, which may be an electro-acoustic or optical signal generator, in particular. A microcontroller MC communicates with these components and controls them and the switches S1 and S2. The microcontroller MC is connected to the live wire A1-B1 of the two-wire line via a block TX/RX and communicates with the bus master, for example via a UART interface. The microcontroller MC and the aforementioned components 1 to 4 receive their operating voltage $U_B$ of +3.3 V, for example, from an ordinary voltage regulator 5, the input of which receives a correspondingly higher supply voltage from a power supply circuit 6. The input of the latter is connected to the wire A1-B1 of the two-wire line, which is at +40 V, for example.

According to the prior art, the power supply circuit 6 essentially comprises a constant current circuit which charges a buffer or storage capacitor to the external power supply voltage $U_v$. The voltage modulation of the power supply voltage $U_v$ for the purpose of transmitting bit-coded messages from the bus master to the subscriber therefore results in the constant current circuit drawing current or power from the two-wire line only during the pulse pauses, because during the pulse length the voltage to which the storage capacitor has been charged is higher than the instantaneous power supply voltage.

The graphs in FIGS. 2a and 2b illustrate in highly simplified form that the resistance of the two-wire line therefore results in the voltage swing becoming ever smaller as the distance between the subscribers and the bus master increases and as the number of subscribers increases. FIG. 2a shows the voltage profile for a few communication pulses following a long starting pulse at the start of the two-wire line, i.e. on the connections of the bus master. The power supply voltage is 40 V. The voltage swing or the modulation depth is 8 V (for example). FIG. 2b shows the same voltage profile for a subscriber which is a few hundred meters away from the bus master, for example. The power supply voltage has fallen by 5 V to 35 V on account of the quiescent current consumption of the subscribers. The voltage swing is now only approximately 3 V, however. The smaller the voltage swing, the more likely decoding and therefore communication errors are to arise, especially since the gradient of the pulse edges also decreases as the distance from the bus master increases (not shown in FIG. 2b). The voltage swing is reduced still further if a subscriber simultaneously sends a bit-coded message to the bus master in the form of a current modulation, since the increased current draw by the subscriber in question causes an additional fall in the level of the power supply voltage $U_v$ on the two-wire line.

Figure 3:
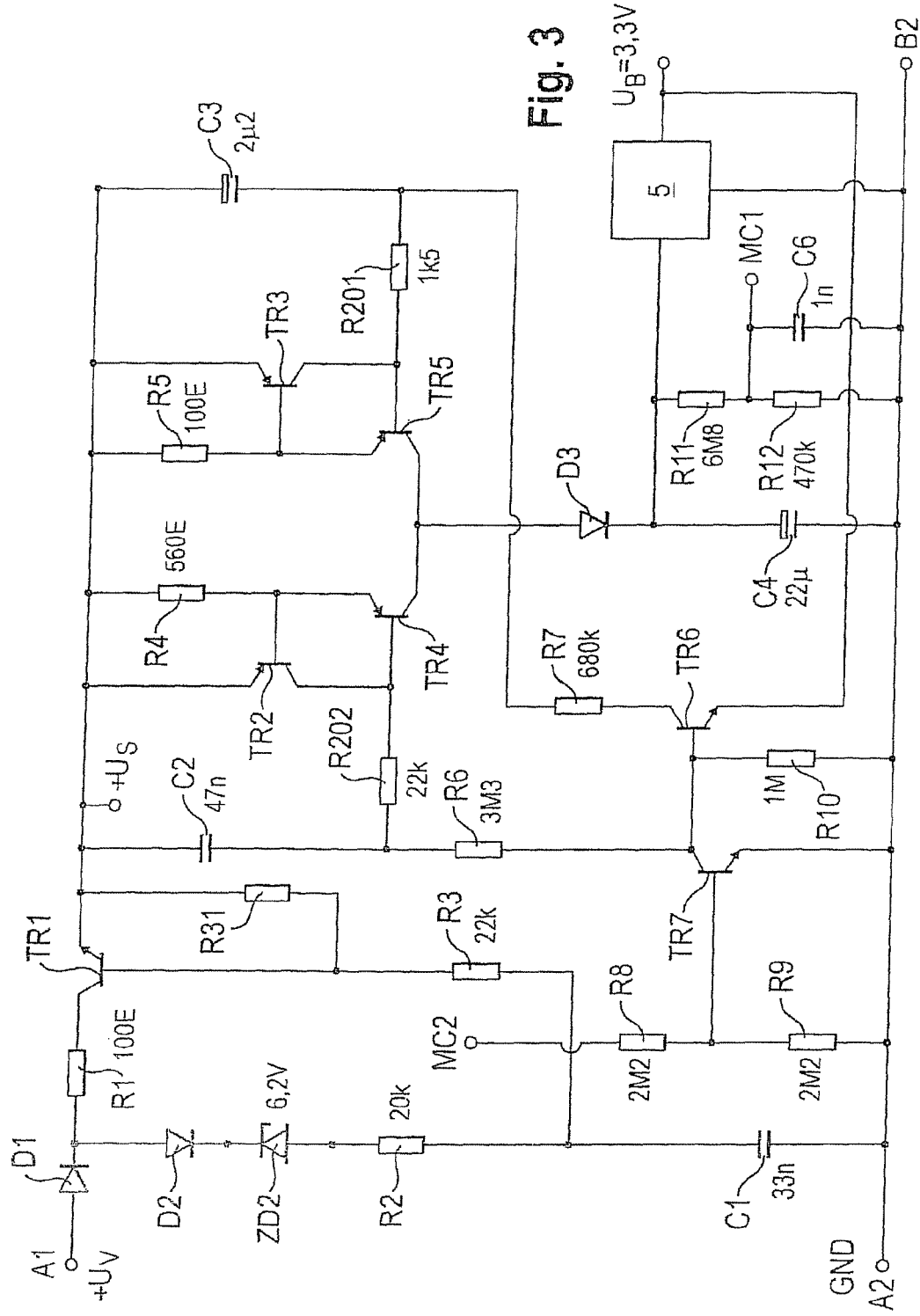
FIG. 3 shows a circuit diagram of an exemplary embodiment of the internal power supply of a subscriber.

These drawbacks of supplying current to the subscribers based on the prior art are avoided by the power supply shown as a circuit diagram in FIG. 3 based on block 6 in FIG. 1 (with the addition of block 5 to aid understanding).

The circuit shown in FIG. 3 is connected to the connections A1, A2 of the subscriber. Since the subscribers can also be powered from the end of the two-wire line in the case of a short circuit or an interruption in the progress of the two-wire line, the circuit is also connected to the connection B2 of the subscriber.

In the quiescent case initially under consideration, a voltage U, of, by way of example, +40 V with respect to the reference-earth potential GND is applied to the connection A1. A diode D1 is followed by an in-phase regulator, which essentially comprises a transistor TR1 with a collector resistor R1 and a high-value emitter/base resistor R31. The diode D1 prevents feedback into the two-wire line when $U_v$ falls to a level which is lower than the voltage on the emitter of TR1, for example during transmission of a starting pulse of 0 V or during the pulse length of communication pulses. TR1 receives its base current via a diode D2, a zener diode ZD2, in this case with a zener voltage of 6.2 V, a resistor R2 and a resistor R3. R2 and R3 have a capacitor C1 connected to GND between them. The resistor R2 and the capacitor C1 form an RC element. When $U_V$ is applied, TR1 therefore receives its base current with a time delay on account of R2, C1. A voltage $U_s$ appears on the emitter of TR1, said voltage being around 33 V with the dimensioning indicated. The time constant of R2, C1 is proportioned such that it is a multiple of the bit time, that is to say the pulse length of a communication pulse. The zener voltage of ZD2 is chosen to be at least equal to the voltage swing of the communication pulses at the start of the two-wire line, taking into account the forward voltages of D1 and D2. When the level of $U_v$ falls to the value which corresponds to the communication pulses, assumed to be 34 V, C1 therefore provides the base current for TR1 during the pulse length, and TR1 therefore remains on, as a result of which the voltage $U_s$ on the emitter thereof remains at least essentially constant and consequently decoupled from the level fluctuations of $U_v$ during the communication pulses. In this case, D2 prevents C1 from being able to discharge via the low-resistance collector/emitter path of TR1.

The internal supply voltage $U_s$ is applied to two parallel constant current circuits which provide different levels of constant currents. In order to start up, the alarm requires a very much higher current than the quiescent current, which may be between 100 and 200 µA, for example. The same applies when the alarm sends data messages in the form of a current modulation to the bus master and/or actuators such as optical or acoustic signal generators are activated. This increased power or current requirement is covered by means of the second constant current source.

The first constant current circuit essentially comprises TR2, TR4 and R4, which are connected together as is known per se. The base of TR4 and hence also the collector of TR2 are connected to the reference-earth potential via resistors R202 and R6, and the base/emitter junction of a transistor TR6 is connected to the output of the voltage regulator 5 (cf. also FIG. 1). This output is at $+U_B$, e.g. +3.3 V, before and during connection of $U_v$ to GND and after a sufficient rise in the voltage at the input of the voltage regulator 5. The connecting point between R202 and R6 is connected via a capacitor C2 to the emitter of TR1, i.e. to $U_s$. When the emitter of TR1 changes to $U_s$, C2 therefore uses R202 to keep the transistor TR4 and hence this constant current circuit turned off by and large until C2 has been charged to approximately 0.6 V via R6 and the base/emitter junction of TR6. C2 thus forms an RC element with R6. As a result, TR4 turns on after a time delay and then uses a discharge protection diode D3 to provide a storage capacitor C4 with a charging current which is limited by R4 in connection with TR2, for example to 1 mA.

The second constant current circuit is switchable and designed for a relatively high constant current of 6 mA, for example. It essentially comprises the transistors TR3 and TR5 and also a resistor R5 and is of similar circuit design to the first constant current circuit. The collector of TR5, like the collector of TR4, is connected to C4 via D3. The base of TR5 and the collector of TR3 are connected to the collector of a transistor TR6 via a resistor R201 and a resistor R7. The connecting point between R201 and R7 is connected to the emitter of TR1, i.e. to the supply voltage $U_s$, via a capacitor C3. C3 forms an RC element with R7 and has the same function for the second constant current circuit as R6, C2 for the first constant current circuit. However, the capacitor C3 has a substantially higher value than C2, and the resistor R7 has a substantially lower value than R6.

The RC elements R6, C2 and R7, C3 of the constant current circuits prevent the alarm from drawing a high switch-on current particularly when the power supply voltage is applied, inter alia on account of C4. The time constant of R6, C2 may be between 100 and 200 ms, for example. The time constant of R7, C3 is expediently significantly greater on account of the higher current drawn by the second constant current circuit.

When the alarm is started up by applying the power supply voltage $U_v$, both constant current circuits charge the storage capacitor C4 via D3 approximately to the supply voltage $U_s$, i.e. minus the voltage drops across the transistor and diode paths. The storage capacitor C4 has the standard voltage regulator 5 (cf. FIG. 1) connected to it, which provides the internal operating voltage $U_B$ of 3.3 V.

In addition, the storage capacitor C4 has a voltage divider R11, R12 connected in parallel with it. An interference suppression capacitor C6 is in parallel with R12. The tap on this voltage divider is connected to the port or connection MC1 of the microcontroller MC in FIG. 1. This connection MC1 is used by the microcontroller MC to monitor the voltage across the storage capacitor C4. When this voltage falls below a prescribed threshold value, the microcontroller disconnects particular circuits in the alarm, particularly those with a high current or power consumption, in order to preserve the ability of the alarm to communicate with the bus master. As an alternative or in addition, the microcontroller can connect the second constant current circuit, as will be explained in more detail below.

The second constant current circuit can be connected and disconnected by means of the base of TR5 as a control input. This is done by using TR6 and an NPN transistor TR7, the collector of which has the base of TR6 connected to it. The base of TR6 and GND have a resistor R10 between them. The base of TR7 is connected to the reference-earth potential via a resistor R9 and to a connection MC2 of the microcontroller MC via a resistor R8. Until the microcontroller is initialized and hence operational, MC2 is at high impedance, and therefore TR7 is off on account of R9 and TR6 is on. The second constant current circuit therefore charges the storage capacitor C4 in parallel with the first constant current circuit following the connection of $U_v$, but preferably using the cited higher current, which increases to its final value with a delay on account of R7, C3.

As soon as the microcontroller is supplied with $U_B$ and is operating, its connection MC2 changes to the logic level H. As a result, TR7 turns on and TR6 is therefore off, as a result of which TR5 and hence also TR3 are off and the second constant current circuit is disconnected. TR4 now receives its base current via TR7. The first constant current circuit thus remains connected.

The microcontroller may additionally be programmed such that it sets its connection MC2 to the logic value L (or makes it high impedance) whenever it either connects a further electrical load in the alarm and/or the voltage on its connection MC1 falls below the threshold value. In that case, the second constant current circuit is connected and provides C4 with its current, which rises with a delay on account of R7, C3.

In the case of communication protocols which comprise the "long" pulses cited at the outset, such as starting, separating or other special pulses, the levels of which change to 0 V or at any rate to a value below $U_s$, the base series resistors R202 in the first constant current circuit and R201 in the second constant current circuit have the function below, particularly when a plurality of such pulses follow one another at short intervals of time. When the level of $U_v$ falls below the value at which ZD2 is no longer on, TR1 is off. Consequently, $U_s$ falls during the length of the "long" pulses. Without R202 or R201, C2 and C3 would therefore quickly discharge via TR4 (and TR2) and TR5 (and TR3). When $U_s$ assumes the output value again, the currents provided by the constant current circuits would start with a corresponding delay on account of the RC elements R6, C2 and R7, C3, however, and rise to their final values. This delay cannot be buffered or bypassed by C4. The alarm would therefore disconnect. This is avoided by the base series resistors R202 and R201. The reason is that C2 and R202 and C3 and R201 each form a further RC element or timer. The time constants of these timers are proportioned such that C2 provides TR4 and C3 provides TR5 with the respective base current during the length of the cited "long" pulses too, taking account of the shortest succession of said pulses. As a result, the constant current circuits C4 recharge again practically immediately (with the relatively small time delay as a result of R2, C1) whenever $U_v$ is at the high output level again.

The aforementioned time constants are expediently in the same order of magnitude as the length of the longest pulses, that is to say in the region of 3 ms, for example, for the pulse lengths cited at the outset.

FIG. 4 shows a highly simplified illustration of the time profile of the level of the power supply voltage $U_v$, which is obtained during the transmission of a message by voltage modulation when the method and the power supply according to the present proposal are used. To clarify matters, the time scale has been greatly stretched in proportion to FIGS. 2a, 2b.

The subscriber, which—as in the case of FIG. 2b—is at a considerable distance from the bus master, receives the communication pulses with almost the full modulation swing, as in FIG. 2a. From t1 to t2 (to clarify matters, the time interval has been chosen in the order of magnitude of the pulse lengths), the subscriber draws a current I of 2 mA, for example, instead of its quiescent current I of 100 μA, for example. The upper and lower levels of U, fall essentially proportionally, but—on account of the RC element R6, C2 and, if the microcontroller MC has switched on the second constant current source, also on account of the RC element R7, C3—not abruptly but rather smoothly. Similarly, the levels also rise smoothly again after t2.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method for operating an alarm system having a control centre which uses a two-wire line, where a first wire of the two wire line is at reference-earth potential, ground, and the second of the two-wire line is at a power supply potential, the two-wire line is used as a field bus, to provide a plurality of subscribers with a power supply voltage and to send communication messages in the form of pulse trains impressed on the power-supply voltage by voltage lowering, wherein each subscriber takes the power supply voltage and produces an internal operating voltage which is lower than the power supply voltage, characterized in that the power supply voltage in each subscriber provided from the two-wire line is reduced to an internal supply voltage which is lower than the power supply voltage at least by the amplitude of the pulses of the communication messages, and in that the internal operating voltage of the subscriber is produced from this internal supply voltage.

2. A method according to claim 1, characterized in that the internal supply voltage is produced so as to rise gradually with a time delay when the power supply voltage is connected.

3. An alarm system having a control centre to which subscribers are connected by means of a two-wire line, said subscribers receiving from the control centre, via the two-wire line operated as a field bus, both a power supply voltage and communication messages in the form of pulse trains impressed on the power supply voltage as voltage modulation, and each subscriber comprises a constant current circuit which is connected to the two-wire line and which is used to charge a storage capacitor which has a voltage regulator connected to the storage capacitor which produces an internal operating voltage, characterized in that the constant current circuit has a voltage transformer connected upstream of the constant current circuit which reduces the power supply voltage to an internal supply voltage which is lower than the power supply voltage at least by the voltage swing of the pulses of the communication messages on the two-wire line wherein the voltage transformer further comprises an in-phase regulator.

4. An alarm system according to claim 3, characterized in that the in-phase regulator comprises a regulating transistor in an emitter-follower circuit, the collector/base junction of said regulating transistor containing a zener diode for producing the supply voltage on the emitter of the regulating transistor and, in series with the zener diode, an RC element for the reference-earth potential of the two-wire line.

5. An alarm system according to claim 4, characterized in that the input of the in-phase regulator and the live connection of the two-wire line have a forward-biased diode between them.

6. An alarm system according to claim 4, characterized in that the time constant of the RC element is greater than the pulse length of the communication pulses.

7. An alarm system according to claim 4, characterized in that the zener diode has a diode in series with the zener diode which prevents the capacitor of the RC element from discharging via the collector/emitter path of the regulating transistor when the internal supply voltage of the subscriber falls.

8. An alarm system according to claim 3, characterized in that the in-phase regulator has a further, switchable constant current circuit connected to it in parallel with the constant current circuit.

9. An alarm system according to claim 8, characterized in that at least one of the constant current circuits has a control input which has an RC element connected to the control input which delays the rise of the current provided by the constant current circuit (charging current) when the power supply voltage is switched on.

10. An alarm system according to claim 8, characterized in that the capacitor of the RC element of at least one of the constant current circuits is connected to the control input of said circuit via a resistor which, with the capacitor, forms a further RC element which has a discharge time constant which is greater than the pulse length of the longest communication pulse.

11. An alarm system according to claim 8, characterized in that the control input of one of the constant current circuits receives an inhibit signal via a connection of the microcontroller of the subscriber as soon as the internal operating voltage of the subscriber has been reached.

12. An alarm system according to claim 11, characterized in that the control input of the constant current circuit turned off after the internal operating voltage has been reached receives an enable signal via the same connection of the microcontroller when there is an increased current requirement for the subscriber.

13. An alarm system according to claim 3, characterized in that the storage capacitor has a voltage monitoring circuit connected to it which disconnects individual electrical loads in the subscriber when the voltage across the voltage regulator falls below a prescribed threshold value.

14. An alarm system comprising a control centre and a plurality of subscribers, the plurality of subscribers are connected to the control centre by means of a two-wire line, said plurality of subscribers receiving from the control centre, via the two-wire line operated as a field bus, both a power supply voltage and communication messages in the form of pulse trains impressed on the power supply voltage as voltage modulation, and each of the plurality of subscribers further comprises a constant current circuit which is connected to the two-wire line and which is used to charge a storage capacitor which has a voltage regulator connected to the storage capacitor which produces an internal operating voltage, wherein the constant current circuit has a voltage transformer connected upstream of the constant current circuit which reduces the power supply voltage to an internal supply voltage which is lower than the power supply voltage at least by the voltage swing of the pulses of the communication messages on the two-wire line and wherein the voltage transformer further comprises an in-phase regulator.

* * * * *